US011085530B2

(12) United States Patent
Lee et al.

(10) Patent No.: US 11,085,530 B2
(45) Date of Patent: Aug. 10, 2021

(54) ACTIVE SHIFT CONTROL METHOD FOR POWER-OFF DOWNSHIFT OF HYBRID VEHICLE

(71) Applicants: Hyundai Motor Company, Seoul (KR); Kia Motors Corporation, Seoul (KR)

(72) Inventors: Chan Ho Lee, Gyeonggi-do (KR); Jeong Soo Eo, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/672,791

(22) Filed: Nov. 4, 2019

(65) Prior Publication Data
US 2020/0318731 A1    Oct. 8, 2020

(30) Foreign Application Priority Data
Apr. 3, 2019   (KR) .................. 10-2019-0038780

(51) Int. Cl.
| | |
|---|---|
| B60W 20/40 | (2016.01) |
| F16H 61/04 | (2006.01) |
| B60W 10/02 | (2006.01) |
| F16H 59/20 | (2006.01) |
| F16H 59/02 | (2006.01) |
| F16H 59/18 | (2006.01) |

(52) U.S. Cl.
CPC ......... *F16H 61/0403* (2013.01); *B60W 10/02* (2013.01); *B60W 20/40* (2013.01); *F16H 59/0217* (2013.01); *F16H 59/20* (2013.01); *F16H 2059/186* (2013.01); *F16H 2061/0422* (2013.01)

(58) Field of Classification Search
CPC .. F16H 61/0403; F16H 59/20; F16H 59/0217; F16H 2061/0422; F16H 2059/186; F16H 2061/0492; F16H 59/14; B60W 20/40; B60W 10/02; B60Y 2200/92
See application file for complete search history.

(56) References Cited

U.S. PATENT DOCUMENTS

| | | | |
|---|---|---|---|
| 8,777,811 B2* | 7/2014 | Suzuki .................. | B60K 6/445 |
| | | | 477/109 |
| 2019/0299965 A1* | 10/2019 | Vollmar ................ | B60W 10/11 |
| 2020/0262431 A1* | 8/2020 | Fehr ....................... | B60W 10/06 |

* cited by examiner

*Primary Examiner* — Justin Holmes
(74) *Attorney, Agent, or Firm* — Mintz Levin Cohn Ferris Glovsky and Popeo, P.C.; Peter F. Corless (57) ABSTRACT

An active shift control method for a power-off downshift of the hybrid vehicle is provided. The method includes increasing the torque of an engagement clutch in a transmission while disengaging a disengagement clutch by reducing the torque of the disengagement clutch in the transmission, when the shift of a power-off downshift is requested. A motor speed is adjust for a transmission input shaft rotary speed to reach a predetermined target stage synchronization speed of a target stage after shifting, and the torque of the engagement clutch is maintained in a state where the disengagement clutch has been disengaged. The engagement of the engagement clutch is completed by increasing the torque of the engagement clutch when the transmission input shaft rotary speed has reached the target stage synchronization speed.

12 Claims, 7 Drawing Sheets

RELATED ART

FIG.7

ACTIVE SHIFT CONTROL METHOD FOR POWER-OFF DOWNSHIFT OF HYBRID VEHICLE

CROSS-REFERENCE TO RELATED APPLICATION

This application claims under 35 U.S.C. § 119(a) the benefit of priority to Korean Patent Application No. 10-2019-0038780 filed on Apr. 3, 2019, the entire contents of which are incorporated herein by reference.

BACKGROUND

(a) Technical Field

The present disclosure relates to a shift control method of a hybrid vehicle, and more particularly, to a method for controlling a shift of a vehicle when a power-off downshift is requested by a shift lever operation of a driver during coasting of a hybrid vehicle.

(b) Background Art

A hybrid vehicle is a vehicle that uses two or more different driving sources, and generally refers to a vehicle driven by an internal combustion engine (ICE) and an electric motor. The hybrid vehicle outputs optimum torque according to how the engine and the motor are operated in harmony during operation, and maximize fuel efficiency of the vehicle. The hybrid vehicle includes various driving systems in various structures, and is known to have a transmission mounted electric device (TMED) hybrid system for connecting an engine and a motor via an engine clutch and connecting a transmission to the output side of the motor.

Figure 1:
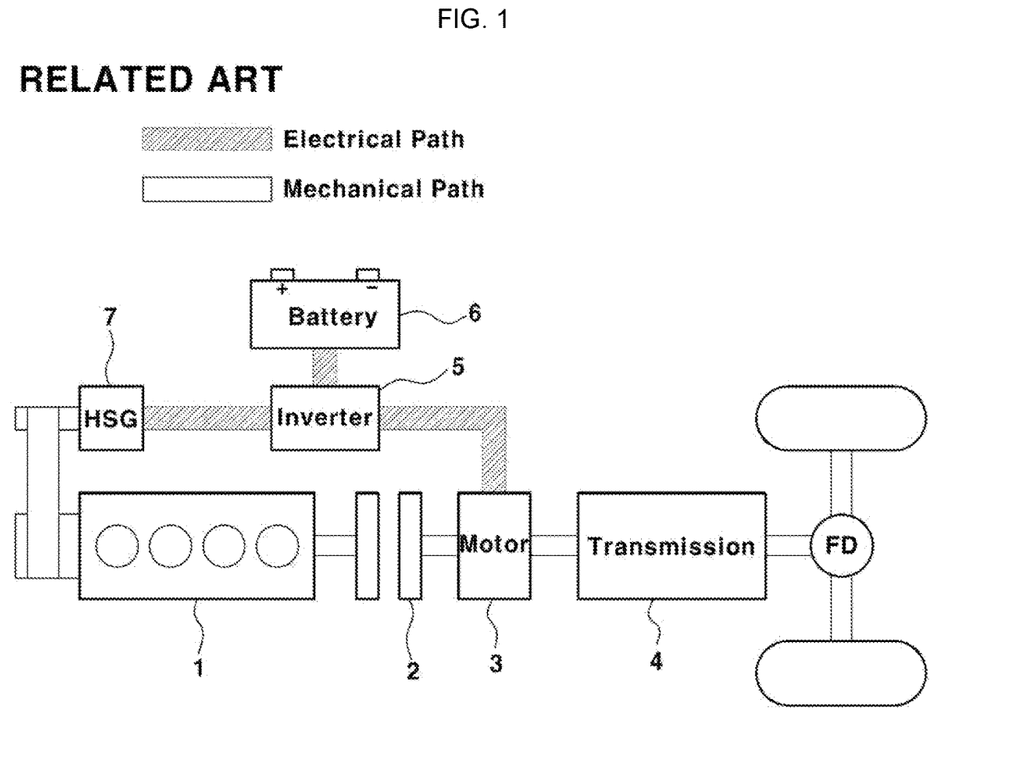
FIG. 1 is a diagram schematically illustrating a configuration of a power train of a general hybrid vehicle according to the related art.

FIG. 1 is a diagram illustrating a configuration of a power train of a hybrid vehicle according to the related art, and illustrates a configuration of a TMED hybrid system in which a motor 3 and a transmission 4 are connected to each other. As illustrated, in the TMED hybrid system, since the transmission 4 is mounted at the output side of the motor 3 for driving the vehicle and a motor output shaft is connected to a transmission input shaft, a motor speed becomes a transmission input shaft rotary speed (i.e., a transmission input speed).

According to this configuration, the TMED hybrid system is configured to include the engine 1 and the motor 3 that are driving sources for operation of the vehicle, an engine clutch 2 interposed between the engine 1 and the motor 3, the transmission 4 connected to the output side of the motor 3, an inverter 5 for operating the motor 3, and a battery 6 chargeably and dischargeably connected to the motor 3 via the inverter 5.

In this configuration, the engine clutch 2 is selectively engaged or disengaged to connect or disconnect between the engine 1 and the motor 3 to be power-transferable to each other. The inverter 5 converts the direct current of the battery 6 into a three-phase alternating current (AC) for operating the motor 3 to apply it to the motor 3. In addition, the transmission 4 shifts the rotational power of the motor 3 or the combined rotational power of the engine 1 and the motor 3 to transfer it to a drive wheel through a drive shaft, and the transmission 4 may be used with an automatic transmission (AT) or a dual clutch transmission (DCT).

In addition, the TMED hybrid system may include a hybrid starter and generator (HSG) 7, which is a motor connected with the engine 1 to be power-transferable to start the engine or for generating power by the rotational force transferred from the engine. The HSG 7 may be operated as a motor or operated as a generator, and since the HSG 7 is connected with the engine to be constantly power-transferable, it may also be used to adjust the engine speed.

The hybrid vehicle equipped with the above-described system may be operated in an electric vehicle (EV) mode, which is a pure electric vehicle mode that operates using the power of the motor 3, or in a hybrid electric vehicle (HEV) mode, which operates using the power of the engine 1 and the power of the motor 3 in combination. In addition, at braking of the vehicle or coasting by inertia, a regenerative mode is performed in which the kinetic energy of the vehicle is recovered through the motor 3 to charge the battery 6. In the regenerative mode, the motor 3 receives the kinetic energy of the vehicle through a vehicle wheel, and at this time, the motor 3 operates as a generator to charge the battery 6 through the inverter 5.

Meanwhile, in a vehicle equipped with the automatic transmission (AT) or the dual clutch transmission (DCT), a power-off downshift is a shift that a shift stage of the vehicle is reduced by the shift lever operation of the driver during coasting that operates by inertia in an idle state where the driver does not depress or engage a brake pedal and an acceleration pedal (e.g., acceleration tip-out and brake-off state), rather than that the vehicle operates by self-power (e.g., second stage→first stage). This power-off downshift is a shift that is different from a near-stop downshift that occurs beyond a predetermined downshift minimum line in a shift pattern.

When the power-off downshift is performed, the driver does not depress the brake pedal and obtains the engine brake effect in many cases, and may occur when the driver operates the shift lever to a lower stage to perform the engine brake during coasting of the vehicle. As described above, since the power-off downshift is intended for the driver to intentionally decelerate the vehicle, it is essential to form a rapid shift and a sufficient deceleration feeling in the power-off downshift situation. Therefore, in the hybrid vehicle, when the power-off downshift is performed, a negative (−) torque is applied to a transmission input shaft so that the coast regeneration by the motor is performed to simulate a situation similar to the engine brake of a conventional internal combustion engine vehicle.

Figure 2:
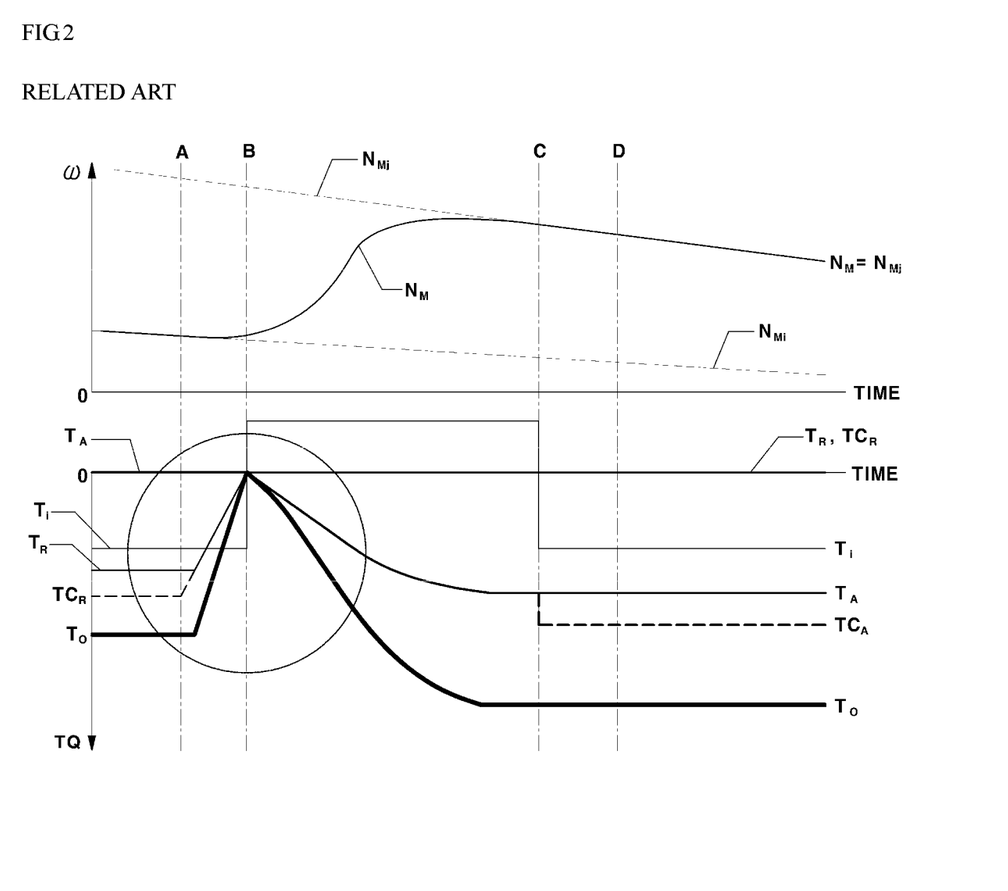
FIG. 2 is a diagram illustrating a power-off downshift control state according to the related art.

FIG. 2 is a line diagram illustrating a motor speed and a torque state during shift procedure of the power-off downshift according to the related art. FIG. 2 illustrates two line diagrams illustrated at the upper and lower sides, respectively, and in the upper line diagram, the vertical axis indicates a speed (w) and the horizontal axis indicates a time, and in the lower line diagram, the vertical axis indicates torque TQ and the horizontal axis indicates a time.

In addition, in the lower line diagram, a lower region indicates a negative (−) torque region and an upper region indicates a positive (+) torque region with respect to a horizontal axis (TQ=0 Nm). In the line diagram in FIG. 2, $N_{Mj}$ refers to a target stage transmission input shaft synchronization speed and $N_M$ to a transmission input shaft rotary speed (e.g., a transmission input speed), and in the TMED hybrid system, the transmission input shaft rotary speed $N_M$ is equal to the motor speed that is a vehicle driving source.

The target stage refers to a shift stage to be reached after a power-off downshift, that is, a target shift stage after shifting, and in the following description, the shift stages before and after the downshift are referred to as a previous stage and a target stage, respectively. In addition, in the following description, a disengagement element and an engagement element indicate the clutches in the transmission, and in the line diagram in FIG. 2, $T_R$ refers to a transfer torque of a transmission disengagement element (e.g., a disengagement clutch), and $TC_R$ to a clutch torque of the transmission disengagement element.

TA refers to a transfer torque of a transmission engagement element (e.g., an engagement clutch), $TC_A$ to a clutch torque of the transmission engagement element, $T_o$ to a transmission output torque (i.e., a transmission output shaft torque), and $T_i$ to a transmission input torque (i.e., a transmission input shaft torque). In the TEMD hybrid system, the transmission input torque becomes a motor torque.

The transfer torques $T_R$, $T_A$ refers to mean clutch rear-end output torques transferred through the corresponding clutches (e.g., the disengagement element and the engagement element), and the clutch torque $TC_R$, $TC_A$ refers to clutch front-end input torque end applied to the corresponding clutch. In addition, it can be understood that in the shift procedure, the disengagement element of the previous stage is released to be in the power disconnection state (e.g., the clutch disengagement) and the engagement element of the target stage is fastened to be in the power connection state, such that in the following description, the disengagement element and the engagement element refer to the elements (the clutches) of the previous stage and the target stage.

Therefore, it can be understood that before and after the shifting, the transfer torque (e.g., the clutch rear-end output torque) transferred through the clutch of the previous stage refers to the transfer torque $T_R$ of the disengagement element (e.g., the disengagement clutch), and the transfer torque transferred through the clutch of the target stage refers to the transfer torque $T_A$ of the engagement element (e.g., the engagement clutch). Of course, when the transfer torques $T_R$, $T_A$ are output and transferred through the rear end of each clutch, the torque applied and inputted to the front end of the clutch is the clutch torques $TC_R$, $TC_A$.

At the conventional power-off downshift, as illustrated in FIG. 2, a transmission control unit (TCU) is supposed to rapidly release the disengagement clutch (e.g., the disengagement element) after the time point A (e.g., $T_R$ is reduced to 0), and to request an increase in torque. The request for the increase in torque causes a hybrid control unit (HCU) and a motor control unit to perform cooperative control, thereby increasing the transmission input torque (e.g., the motor torque) $T_i$, and increasing the transmission input shaft rotary speed (e.g., the motor speed) $N_M$ to be about the target stage transmission input shaft synchronization speed $N_{Mj}$. Alternatively, the shift is completed in a direction of securing deceleration feeling even if acceleration temporarily increases only through a clutch control without increasing any additional torque.

The above-described torque increase control uses a method for requesting a predetermined torque amount or monitoring and feeding back the motor speed, and this is intended to avoid the shock due to excessive deceleration feeling and a transfer torque step before and after shifting ($|T_A-T_R|$) when the clutch torque is much applied. In addition, the transmission output torque $T_o$ after the power-off downshift (after time points C and D) is decreased compared to the transmission output torque before the power-off downshift (before a time point A).

In other words, when the transmission output torque $T_o$ is a negative (−) torque, comparing before shifting and after shifting, the transmission output torque $T_o$ is decreased in the negative torque region in FIG. 2 in the drawing, which means that an absolute value of the transmission output torque $T_o$ increases after shifting compared to before shifting. However, further describing the transmission output torque $T_o$ denoted by the negative (−) torque in FIG. 2, as denoted by the circle in FIG. 2, the transmission output torque $T_o$ has increased to zero in the negative (−) torque region from the time point A to the time point B (e.g., an absolute value of the transmission output torque reduces), and then decreases again from the time point B to the time point C (e.g., an absolute value of the transmission output torque increases).

As described above, according to the related art, since the transfer torque $T_R$ of the disengagement element (the disengagement clutch) is rapidly disengaged, the vehicle deceleration expected by the engine brake is unable to be obtained while the synchronization with the previous stage is released, and rather, the vehicle acceleration increases temporarily.

At this time, even if the transfer torque $T_A$ of the engagement clutch is applied, it is difficult to avoid a reduction in the vehicle deceleration, and in the worst case, as in the line diagram in FIG. 2, a constant deceleration feeling is unable to be secured, and thus, the feeling that the vehicle jumps forward and pulls back after the shift lever operation of the driver (e.g., the feeling due to a decrease after a rapid increase of $T_o$) may occur. As a result, even if the regenerative braking at the vehicle deceleration is intended to obtain the engine brake effect during deceleration of coasting in a state where the transmission input torque is extremely low, the driver may recognize a dangerous situation when feeling that the vehicle suddenly jumps forward (i.e., acceleration feeling) as described above.

In addition, when the transmission control unit side does not actively request an increase in torque due to the above-described reason, or when the torque of the engagement clutch is not used to prevent the shock caused by a substantial transfer torque step before and after the shift synchronization, the shift time is delayed, thereby reducing the driving performance. It is difficult to maintain the deceleration when the torque increase request is actively used for a rapid shift, and it may also be difficult to fundamentally prevent an increase in acceleration, which occurs at the time of disengaging the disengagement clutch, due to a delay of the shift when only the clutch control is used without the torque increase request.

The above information disclosed in this section is merely for enhancement of understanding of the background of the disclosure and accordingly it can contain information that does not form the prior art that is already known in this country to a person of ordinary skill in the art.

SUMMARY

Accordingly, the present disclosure is intended to solve the above problem, and an object of the present disclosure is to provide an active shift control method for a power-off downshift of a hybrid vehicle, which may generate desired vehicle deceleration without occurring vehicle acceleration feeling, and achieve decrease of a shift time and enhancement of the driving performance in the shifting procedure of the power-off downshift.

In order to achieve the object, according to an exemplary embodiment of the present disclosure, an active shift control method for a power-off downshift of a hybrid vehicle may include performing a torque blending control for increasing the torque of an engagement clutch in a transmission while disengaging a disengagement clutch by reducing the torque of the disengagement clutch in the transmission, in response to determining that the shift of a power-off downshift based on a downshift operation of a driver is requested during coasting of a vehicle; adjusting a motor speed so that a transmission input shaft rotary speed reaches a predetermined target stage synchronization speed of a target stage after shifting, and constantly maintaining the torque of the engagement clutch in a state where the disengagement clutch has been disengaged; and completing the engagement of the engagement clutch by increasing the torque of the engagement clutch when the transmission input shaft rotary speed has reached the target stage synchronization speed.

Therefore, according to the active shift control method of the present disclosure, it may be possible to generate the desired vehicle deceleration without occurring the vehicle acceleration feeling, and to achieve shortening of the shift time and enhancement of the driving performance in the shift procedure of the power-off downshift of the hybrid vehicle.

BRIEF DESCRIPTION OF THE DRAWINGS

The above and other features of the present disclosure will now be described in detail with reference to exemplary embodiments thereof illustrated the accompanying drawings which are given herein below by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment. In the drawings, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings so that those skilled in the art at which the present disclosure pertains may easily carry out the present disclosure. However, the present disclosure is not limited to an embodiments described herein but may be also embodied in other forms.

The present disclosure relates to an active shift control method for a power-off downshift of a hybrid vehicle, and is to provide the active shift control method, which may generate desired vehicle deceleration without occurring vehicle acceleration feeling, and achieve decrease of a shift time and enhancement of driving performance in the shift procedure of the power-off downshift.

For this purpose, the active shift control method for the power-off downshift of the present disclosure performs a vehicle driving source speed control based on a target input speed (i.e., a target stage synchronization speed) in an inertia phase control section, and fixes the torque of an engagement element in a transmission to the minimum value to secure uniform vehicle acceleration, thereby enhancing driving performance and enhancing the fuel efficiency by decreasing the shift time.

In addition, the present disclosure discloses an improved control method for performing a simultaneous cooperative control such as a control of a disengagement element and an engagement element in the transmission together with a speed control and a torque control for a motor that is a vehicle driving source during shifting of the power-off downshift. The active shift control method for the power-off downshift of the present disclosure may be applied to a hybrid vehicle, for example, applied to a TMED hybrid vehicle, and also applied to a vehicle equipped with an automatic transmission (AT) or a dual clutch transmission (DCT).

The active shift control procedure for the power-off downshift of the present disclosure may be performed by a cooperative control between known in-vehicle controllers, that is, a plurality of controllers such as a hybrid control unit (HCU), a transmission control unit (TCU), and a motor control unit (MCU), and may also be performed by one controller having an integrated function of these controllers.

Hereinafter, a power-off downshift control method of a hybrid vehicle according to an exemplary embodiment of the present disclosure will be described in detail with reference to FIGS. 3 to 7 as follows.

Figure 3:
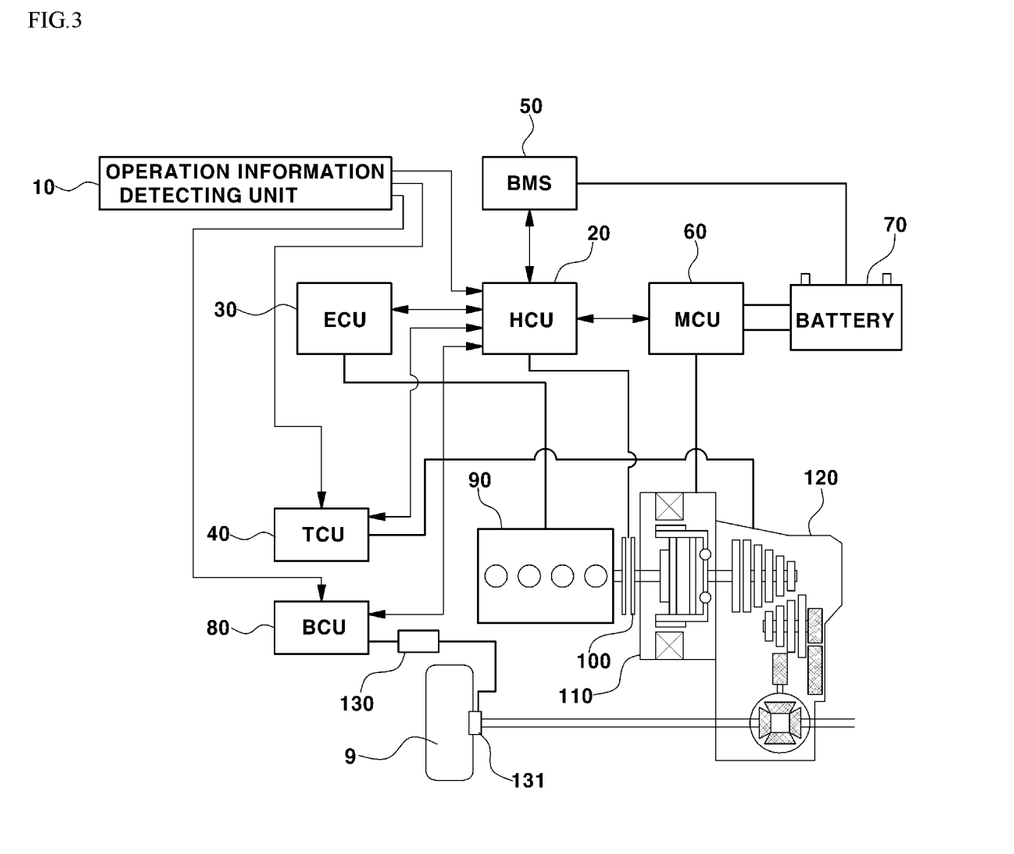
FIG. 3 is a block diagram of a system of the hybrid vehicle to which a power-off downshift control method according to an exemplary embodiment of the present disclosure is applied.

FIG. 3 is a block diagram of a system of a hybrid vehicle to which the power-off downshift control of the present disclosure is applied, and illustrates a system configuration of a TMED hybrid vehicle. As illustrated, the hybrid vehicle may include an engine 90 and a motor 110 that are driving sources for operation of the vehicle, an engine clutch 100 interposed between the engine 90 and the motor 110, and a transmission 120 connected to the output side of the motor 110. In addition, the hybrid vehicle is equipped with a hybrid control unit (HCU) 20 (e.g., controller), which is an upper controller configured to execute the overall operation of the vehicle, and in addition, various controllers configured to operate various devices of the vehicle are provided therein.

For example, an engine control unit (ECU) 30 may be configured to operate the engine 90, a transmission control unit (TCU) 40 may be configured to operate the transmission 120, a battery control unit (BMS) 50 may be configured to collect, use and provide the status information of a battery 70 and execute a control for battery management, a motor control unit 60 configured to operate the motor 110, a brake control unit (BCU) 80 configured to perform a braking control of the vehicle, etc. Then, the battery 70 may be chargeably and dischargeably connected to the motor 110 via an inverter (not illustrated) of the motor control unit 60.

In FIG. 3, reference numeral 130 denotes a hydraulic circuit for generating a brake hydraulic pressure, and reference numeral 131 denotes a wheel brake installed at a vehicle wheel 9 to generate a hydraulic braking force (i.e., a friction braking force). The hybrid vehicle may include a hydraulic braking device (friction braking device), and the hydraulic braking device may include a hydraulic circuit 130 for generating a brake hydraulic pressure, and the wheel brake 131 installed at the vehicle wheel 9 and for generating a braking force (friction braking force) generated from the hydraulic circuit 130.

The brake control unit 80 may be configured to operate the hydraulic braking device, and operate a hydraulic actuator, a valve, etc. not illustrated in the hydraulic circuit 130 to adjust the brake hydraulic pressure applied to a wheel cylinder of the wheel brake 131. In addition, the hybrid control unit 20 and each of the controllers may be configured to perform a cooperative control with respect to the in-vehicle device while exchanging information with each other via controller area network (CAN) communication, and the host controller may be configured to transfer a control command to the controller while collecting various information from the lower controllers.

An operation information detecting unit denoted by reference numeral 10 in FIG. 3 is for detecting vehicle operation information, and the vehicle operation information may include operation input information and vehicle status information. The operation input information may include a brake pedal operation state, an accelerator pedal operation state, a shift lever operation state of a driver, and the vehicle status information may include a vehicle speed and a motor speed.

The operation information detecting unit 10 may include an accelerator pedal sensor (APS) configured to output a signal according to the accelerator pedal operation of the driver, a brake pedal sensor (BPS) configured to output a signal according to the brake pedal operation of the driver, a shift detecting unit configured to detect a position of the shift lever, a vehicle speed detecting unit configured to detect the vehicle speed, and a motor speed detecting unit configured to detect the motor speed, and these may include the hybrid control unit 20 and the transmission control unit 40 to be connected to the in-vehicle controllers so that a detecting value may be input thereto.

Figure 4:
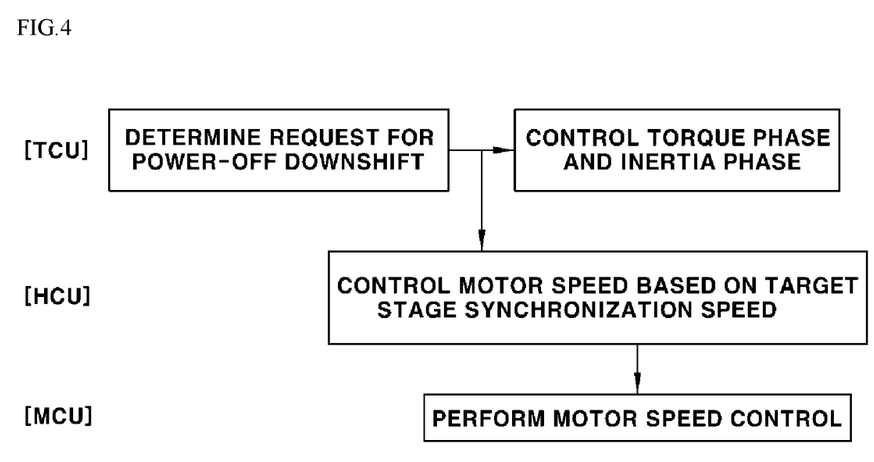
FIG. 4 is a block diagram illustrating a main function performed by each of a plurality of in-vehicle controllers according to an exemplary embodiment of the present disclosure.

FIG. 4 is a block diagram illustrating a main function performed by the in-vehicle controllers in the present disclosure. Further describing the controllers involved in the control method of the present disclosure, the transmission control unit 40 may be configured to determine whether a shift of the power-off downshift is requested from the vehicle operation information detected by the operation information detecting unit 10.

The transmission control unit 40 may be configured to determine that the shift of the power-off downshift is requested when the driver's shift lever operation to the shiftable lower stage is performed (i.e., when the downshift operation of the driver is performed) during coasting of the vehicle in a state where the driver does not depress the accelerator pedal, from the vehicle operation information detected by the operation information detecting unit 10. In addition, the transmission control unit 40 may be configured to receive a signal of the hybrid control unit 20 to execute the engagement and the disengagement of the clutch in the transmission 120 in the shift procedure of the power-off downshift, that is, a torque phase control section and an inertia phase control section, and until the synchronization is performed and then the shift is completed.

Particularly, in the present disclosure, the transmission control unit 40 may be configured to maintain and fix the torques $T_A$, $TC_A$ of the engagement clutch (the engagement element) constantly in a state where the disengagement clutch has been released ($T_{O_R}$, $TC_R=0$) in at least partial section of the inertia phase section, for example, a speed change section and a speed control stabilization section, etc., which will be described later, in the shift control of the power-off downshift. The hybrid control unit 20 may be configured to adjust the speed of the vehicle driving source that is a transmission input shaft rotary speed based on a target input speed in the shift procedure of the power-off downshift.

Herein, the vehicle driving source refers to a motor (drive motor) 110 for operating the vehicle, and the target input speed refers to a predetermined target speed of a target stage after shifting, that is, a target stage transmission input shaft synchronization speed $N_{Mj}$. The present disclosure controls the transmission input shaft rotary speed $N_M$ based on the target stage transmission input shaft synchronization speed $N_{Mj}$ in a state where the disengagement element of the transmission 120, that is, the disengagement clutch that is a clutch of the previous stage has been disengaged after the torque phase control.

The TMED hybrid system may be configured to adjust the transmission input shaft rotary speed (the transmission input speed) $N_M$ to be equal to the speed of the vehicle driving source connected to the input side of the transmission, that is, the motor speed, and the transmission input shaft rotary speed $N_M$ to be the same as the target stage transmission input shaft synchronization speed $N_{Mj}$ (hereinafter referred to as 'target stage synchronization speed') by increasing the motor speed during the speed change section to match the transmission input shaft rotary speed $N_M$ with the target stage transmission input shaft synchronization speed $N_{MJ}$. In addition, the motor control unit 60 may be configured to execute a motor speed control and a motor torque control based on a control command of the hybrid control unit 20.

As described above, it will be described that a control procedure according to an exemplary embodiment of the present disclosure may be performed by a cooperative control between a plurality of controllers, and hereinafter, the plurality of controllers may classified according to the functions thereof and the classified plurality of controllers are cooperatively operated, thereby performing the control procedure according to an exemplary embodiment of the present disclosure. However, it may be described that the plurality of controllers are collectively referred to as a single controller, and furthermore, a single controller actually integrated may also perform the control procedure according to an exemplary embodiment of the present disclosure.

Figure 5:
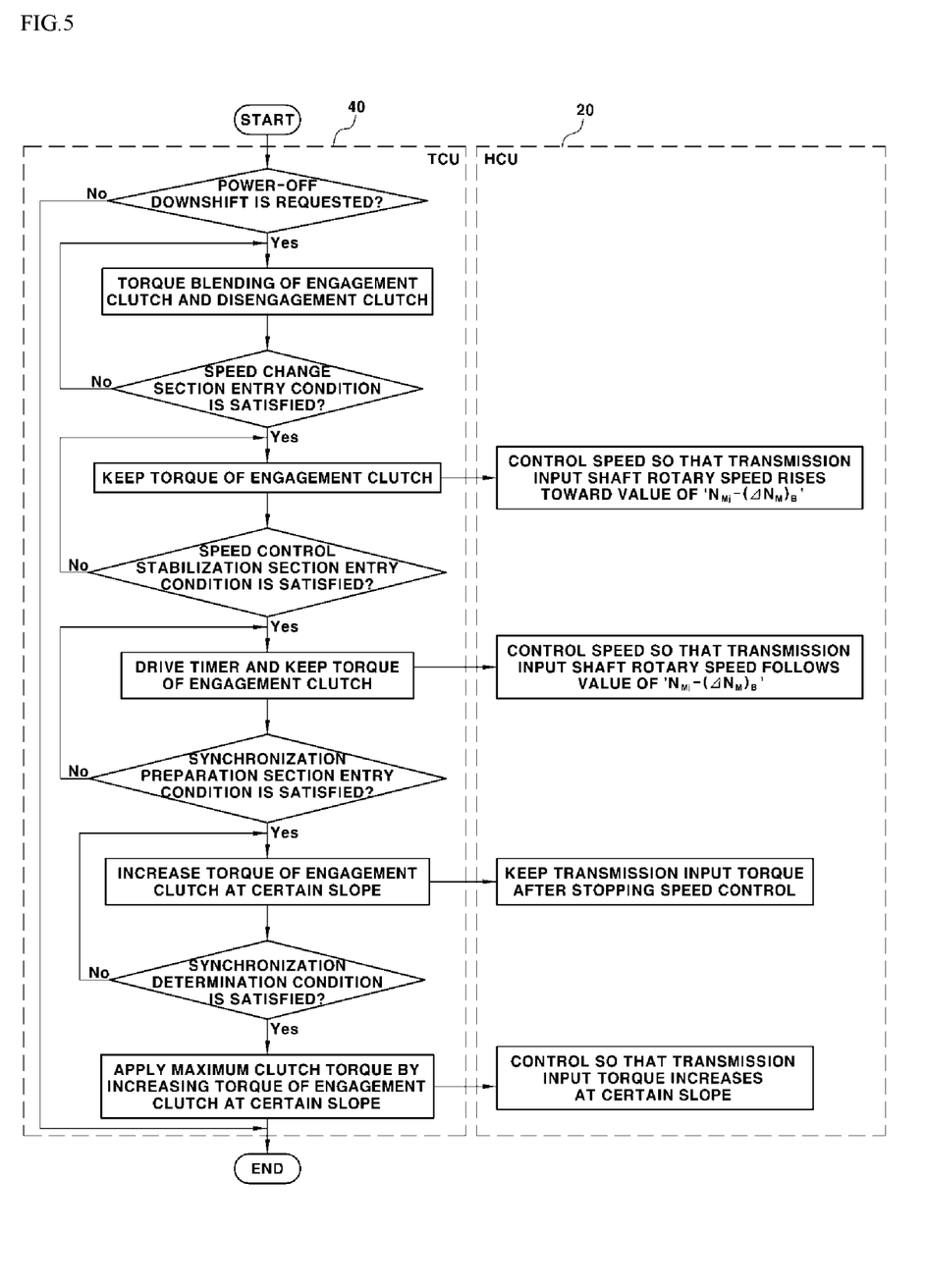
FIG. 5 is a flowchart illustrating a power-off downshift control procedure of the hybrid vehicle according to an exemplary embodiment of the present disclosure.
Figure 6:
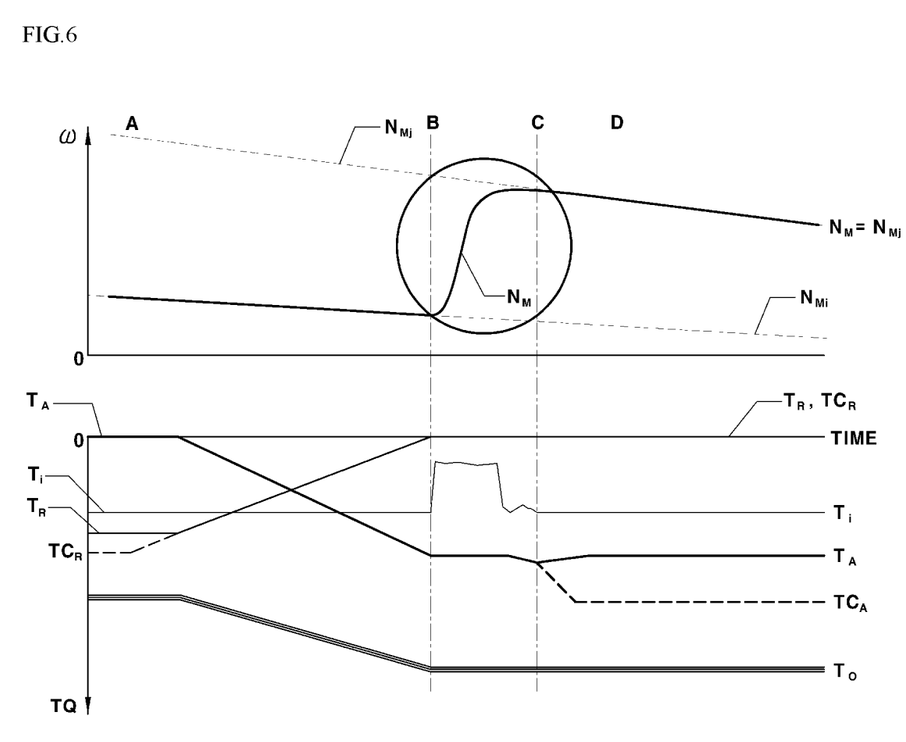
FIG. 6 is a diagram illustrating an example of the power-off downshift control of the hybrid vehicle according to an exemplary embodiment of the present disclosure.

FIG. 5 is a flowchart illustrating a power-off downshift control procedure of the hybrid vehicle according to an exemplary embodiment of the present disclosure, and FIG. 6 is a diagram illustrating an example of the power-off downshift control of the hybrid vehicle according to an exemplary embodiment of the present disclosure and illustrates the motor speed and the torque state during the shift procedure of the power-off downshift.

Figure 7:
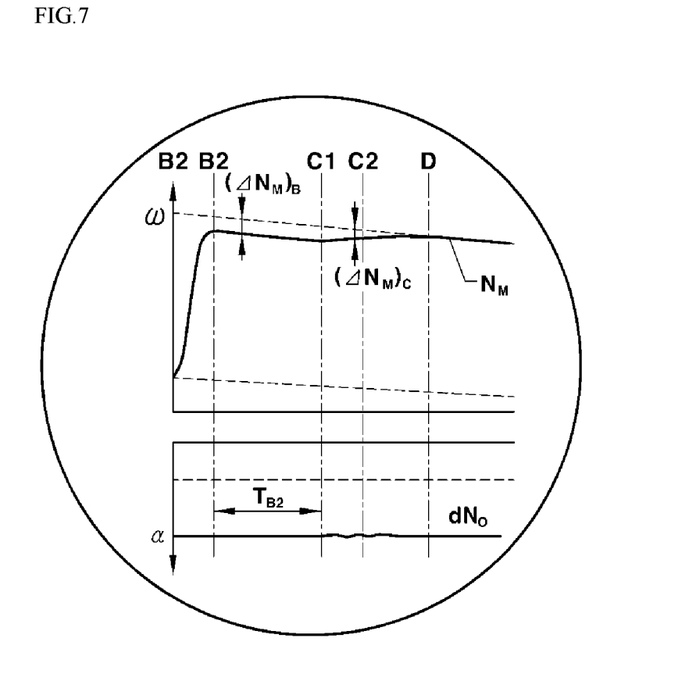
FIG. 7 is a diagram illustrating a speed control state in the power-off downshift control procedure of the hybrid vehicle according to an exemplary embodiment of the present disclosure.

In addition, FIG. 7 is a diagram specifically illustrating a control state of a speed change section and a speed stabilization section in the power-off downshift control procedure of the hybrid vehicle according to an exemplary embodiment of the present disclosure, and an enlarged diagram of the line diagram of the inertia phase control section denoted by the circle in FIG. 6.

First, briefly describing the drawing, FIG. 5 is a diagram illustrating a main procedure of a coordinative control performed by the hybrid control unit (HCU) 20 and the transmission control unit (TCU) 40. Then, FIG. 6 is a diagram compared to FIG. 2 exemplifying the related art, and as in FIG. 2, illustrates two line diagrams illustrated at the upper and lower sides, respectively. In the upper line diagram in FIG. 6, the vertical axis refers to a speed (w) and the horizontal axis to a time, and in the lower line diagram therein, the vertical axis refers to a torque TQ and the horizontal axis to a time.

In addition, in the lower line diagram in FIG. 6, a lower region refers to a negative (−) torque region, and an upper region to a positive (+) torque region with respect to the horizontal axis (TQ=0 $N_m$). In the line diagram in FIG. 6, $N_{Mj}$ refers to the target stage synchronization speed, $N_M$ to the transmission input shaft rotary speed (e.g., the transmission input speed), and the transmission input shaft rotary speed in the TMED hybrid system is equal to the motor speed. Herein, the target stage refers to a shift stage to be reached after the power-off downshift, that is, a target shift stage after shifting.

In the following description, the previous stage refers to a shift stage before the downshift, and the shift stages before and after the downshift are referred to as a previous stage and a target stage, respectively (e.g., at shifting of a second stage→a first stage, the previous stage is the second stage and the target stage is the first stage). In addition, in the following description, the disengagement element and the engagement element refer to the clutches in the transmission 120, and in the line diagram in FIG. 6, $T_R$ refers to the transfer torque of the transmission disengagement element (the disengagement clutch), and $TC_R$ to the clutch torque of the transmission disengagement element.

In the line diagram in FIG. 6, $T_A$ refers to the transfer torque of the transmission engagement element (the engagement clutch), and $TC_A$ to the clutch torque of the transmission engagement element. In addition, $T_o$ refers to the transmission output torque (i.e., the transmission output shaft torque), and $T_i$ to the transmission input torque (i.e., the transmission input shaft torque). The transfer torques $T_R$, $T_A$ may refer to the clutch rear-end output torques transferred through the corresponding clutches (the disengagement clutch and the engagement clutch), and the clutch torques $TC_R$, $TC_A$ may refer to the clutch front-end input torque applied to the corresponding clutch.

In other words, when the torques applied and input through the front end of each clutch are the clutch torques $TC_R$, $TC_A$, the torques output and transferred through the rear end of each clutch are the transfer torques $T_R$, $T_A$. In addition, in the shift procedure, the disengagement element of the previous stage is released to be in a power disconnection state (clutch disengagement) and the engagement element of the target stage is fastened to be in a power connection state (clutch engagement), such that it can be understood in the following description that the disengagement element and the engagement element refer to each element (clutch) of the previous stage and the target stage of the transmission 120, respectively.

The disengagement element (e.g., the disengagement clutch) refers to the previous stage clutch of the transmission 120 that is disengaged during the shift procedure in the engaged state, and the engagement element (e.g., the engagement clutch) refers to the target stage clutch of the transmission 120 engaged during the shift procedure in the disengaged state. In addition, the transfer torque (e.g., the clutch rear-end output torque) transferred through the clutch at the previous stage refers to the transfer torque $T_R$ of the disengagement element (e.g., the disengagement clutch), and the transfer torque transferred through the clutch at the target stage refers to the transfer torque $T_A$ of the engagement element.

In addition, values of the clutch torques $TC_R$, $TC_A$, that is, a value of the clutch torque $TC_R$ of the disengagement element at the previous stage and a value of the clutch torque $TC_A$ of the engagement element at the target stage may become command values for disengaging and engaging the clutch outputted by the transmission control unit 40 (e.g., torque values to be applied to the clutch). The transmission input torque $T_i$ in FIG. 6 is a torque value adjusted by the controller or a cooperative control of the controller, and the transmission input torque in the TMED hybrid system becomes the motor torque.

In the present disclosure, the torque to be adjusted according to the command value is the clutch torque $TC_R$ of the disengagement element, the clutch torque $TC_A$ of the engagement element, the transmission input torque etc., and the transfer torques $T_A$, $T_R$ and the transmission output torque $T_o$ are torques that are the control results. In addition, the torque values in FIG. 6 are all torque values based on the transmission output shaft, except for the transmission input torque $T_i$.

In other words, all of the transfer torques $T_R$, $T_A$ and the clutch torques $TC_A$, $TC_R$ including the transmission output torque $T_o$ are the transmission output shaft reference torque, and these torques may be equivalent torques converted and changed into the torque value at the transmission output shaft considering a gear ratio corresponding to the gear stage (e.g., the previous stage and the target stage) of the transmission 120. The transmission output shaft reference torque may also be a torque that is directly obtained or estimated and calculated based on the output shaft of the transmission, in addition to the converted equivalent torque.

Hereinafter, describing the power-off downshift control procedure according to an exemplary embodiment of the present disclosure with reference to FIGS. 5 to 7 step by step, first, the transmission control unit 40 may be configured to detect the shift request of the power-off downshift from the current vehicle operation information detected by the operation information detecting unit 10. In other words, the transmission control unit 40 may be configured to determine whether it is a situation where the power-off downshift is requested from the current vehicle operation information. Herein, the transmission control unit 40 may be set to determine as a situation where the power-off downshift is requested when the downshift operation of the driver is performed during coasting of the vehicle, and when the shift stage selected by the downshift operation is shiftable.

In other words, the transmission control unit 40 may be configured to determine that the shift of the power-off downshift is requested from the vehicle operation information detected by the operation information detecting unit 10 when the shift stage, which has been selected by the driver operating the shift lever to the lower stage during coasting of the vehicle in a state where the driver does not depress the brake pedal and the accelerator pedal, is a shift stage that is currently shiftable.

As described above, in response to determining as a situation where the power-off downshift is requested, the shift control for the power-off downshift may be started at a time point A in FIG. 6, and the torque phase control may be started in the shift control procedure. In the present disclosure, a condition in which the downshift operation of the driver is performed during coasting of the vehicle and the shift stage selected by the downshift operation is shiftable shift stage is a shift procedure entry condition of the present disclosure, as described above, and specifically, is also an entry condition of the torque phase control.

In the power-off downshift, it may be necessary to acquire the vehicle deceleration, and since one desired by the driver through the downshift (the downward shift) during coasting is the same effect as the engine brake and the vehicle traveling feeling, it is preferable to implement a speed change at the deceleration as fast as expected rather than a fast speed change at the incomplete deceleration. In addition, in the EV mode, the noise of the motor is minimal compared to the engine driving state, such that unlike the HEV mode, the driver does not expect a rapid increase in the engine speed, thereby performing the torque phase control.

In the torque phase control section (the A-B section in FIG. 6) in the shift procedure according to the present disclosure, a torque blending may be performed so that the mixed torque is generated by simultaneously adjusting the torque $TC_R$ of the transmission disengagement element (the disengagement clutch) and the torque $TC_A$ of the engagement element (the engagement clutch), and the transmission output shaft torque $T_o$ becomes the sum of the torque $T_R$ of the disengagement element and the torque $T_A$ of the engagement element while the torque blending is performed.

The torque blending control may be performed to blend by adjusting so that the sum of two torques of the torque $T_A$ of the engagement element and the torque $T_R$ of the disengagement element satisfies the transmission output torque $T_o$ from the time point A to the time point B. At this time, the torque blending may be preformed in which the transmission disengagement element (the disengagement clutch) is disengaged ($T_R$ is reduced to 0), and the transmission engagement element (the engagement clutch) is fastened after the time point when the torque phase control has been started (the time point A), and the clutch torque $TC_R$ (the negative (−) torque) applied through the transmission disengagement element is gradually reduced based on the absolute value thereof, and at the same time, the clutch torque $TC_A$ (the negative (−) torque) applied through the transmission engagement element is gradually increased based on the absolute value thereof.

As a result, while the torque blending is performed, a torque of the magnitude that mixes the transfer torque $T_R$ of the disengagement element and the transfer torque $T_A$ of the engagement element is output from the transmission output shaft as a result of the control of each clutch torque, and at this time, a value of the transmission output torque $T_o$ (the transmission output shaft torque) becomes a value of the sum of transfer torque $T_R$ of the disengagement element and the transfer torque $T_A$ of the engagement element. In addition, the transmission output torque $T_o$ generated by blending the transfer torque $T_R$ of the disengagement element and the transfer torque $T_A$ of the engagement element in the torque phase control section at the power-off downshift is a negative (−) torque.

The transfer torque $T_R$ of the disengagement element and the transfer torque $T_A$ of the engagement element may be adjusted, respectively to gradually the transmission output torque $T_o$ in the torque phase control section at a constant slope based on the absolute value thereof in the negative (−) torque range. Herein, gradually increasing the torque having the negative (−) value based on the absolute value thereof indicates gradually decreasing the torque, which is a negative value in the line diagram in FIG. 6, in the drawing.

As described above, at the power-off downshift of the present disclosure, the torque blending control through the torque control for the engagement element and the disengagement element in the transmission 120, that is, the torque blending control for blending so that the sum of the torque $T_A$ of the engagement element and the torque $T_R$ of the disengagement element satisfies the transmission output torque $T_o$ is performed in the torque phase control section from the time point A to the time point B. In addition, the transmission input torque (the motor torque) $T_i$ is a negative (−) torque in the torque phase control section at the power-off downshift, and in the present disclosure, the transmission input torque $T_i$ in the torque phase control section may be adjusted to constantly maintain the same value as before the shifting without changing.

In the present disclosure, when the motor torque, which is the transmission input torque has been reduced based on the absolute value thereof during the inertia phase control section that is the B-C section, and the transmission input shaft rotary speed $N_M$ reaches the target stage synchronization speed $N_{MJ}$ to perform the speed synchronization, it returned to an original level in the C-D section, that is, the torque level at the torque phase control. In addition, when the transmission previous stage disengagement element (the disengagement clutch) is disengaged until the transfer torque $T_R$ becomes a zero torque to complete the torque phase control section, it enters into the speed change section and in the enlarged diagram in FIG. 7, B1 refers to a time point when the speed change section is started.

Referring to FIG. 7, the B-C section may be subdivided into three sections in total, B1-B2, B2-C1, and C1-C2. In the shifting according to the present disclosure, the B1-B2 may be defined as a speed change section, the B2-C1 may be defined as a speed control stabilization section, and the C1-C2 may be defined as a synchronization preparation section.

First, the entry condition of the speed change section may be set to a condition that senses an increase in the motor speed, which is the transmission input shaft rotary speed (the transmission input speed) $N_M$. Herein, satisfying the entry condition refers to a state where the motor speed is increasing after the disengagement clutch is disengaged (e.g., the torque of the disengagement clutch is reduced to zero), and a state where a slip is occurring before the engagement clutch is engaged.

When the speed change section is started by satisfying the above-described entry condition at the time point B1, the transmission control unit 40 may be configured to constantly maintain the transfer torque $T_A$ of the engagement element (the engagement clutch) in the transmission 120, thereby securing constant vehicle acceleration. At this time, the transmission control unit 40 may be configured to output a command value relating to the clutch torque $TC_A$ of the engagement clutch at a constant value to adjust the clutch torque $TC_A$ and the transfer torque $T_A$ of the engagement clutch to a constant torque value (e.g., fixing the torque of the engagement clutch).

In addition, since the disengagement clutch has been disengaged during the torque phase control section A-B, the transfer torque $T_R$ of the disengagement clutch does not act at the time point B1, such that the transfer torque $T_A$ of the engagement clutch is the same as the target stage transfer torque, and at this time, the output torque $T_o$ may be expressed by the following Equation 1.

$$T_o = \text{sign}(N_M - N_{Mj})|TC_A| \qquad \text{Equation 1}$$

wherein, $N_M$ refers to the transmission input shaft rotary speed (the transmission input speed, the motor speed), $N_{Mj}$ to the target stage synchronization speed, and sign (x) to a function representing a value of +1 when x>0 and a value of −1 when x<0. Therefore, the sign $(N_M - N_{Mj})$ indicates a value of +1 when $N_M > N_{Mj}$, and the sign $(N_M - N_{Mj})$ indicates a value of −1 when $N_M < N_{Mj}$. In addition, ∥ is a symbol representing an absolute value.

The transmission control unit 40 may be configured to output a command value for the clutch torque $TC_A$ of the engagement clutch to adjust the transfer torque $T_A$ of the engagement clutch during the shifting to adjust the clutch torque $TC_A$ by the command value output by the transmission control unit 40, thereby performing a control of the transfer torque $T_A$.

In the Equation 1, since the transmission output torque (e.g., the transmission output shaft torque) $T_o$ has a negative value when the target stage synchronization speed $N_{Mj}$ is greater than the motor speed that is the transmission input shaft rotary speed $N_M$ ($N_{Mj} > N_M$), the motor speed $N_M$ should be adjusted to be less than the target stage synchronization speed $N_{Mj}$ to obtain the vehicle deceleration feeling. In addition, the hybrid control unit 20 may be configured to adjust a speed of the motor 110, which is the driving source of the vehicle, to increase the transmission input shaft rotary speed $N_M$ toward the target stage synchronization speed $N_{Mj}$ regardless of the required torque from the time point B1 to the time point B2.

As described above, in adjusting the speed of the motor 110, since the transmission output torque $T_o$ may be determined by the transfer torque $T_A$ of the engagement clutch, it may be possible to change the speed within a rapid period of time by driving the motor 110 that is the driving source of the vehicle regardless of the above. In addition, when the motor speed $N_M$ is adjusted to be greater than the target stage synchronization speed $N_{Mj}$, the acceleration feeling rather than the deceleration feeling may be formed, such that $(\Delta N_M)_B$, which is a predetermined positive (+) value as a margin value, rather other the target stage synchronization speed $N_{Mj}$ to perform the speed control with a margin to increase the motor speed $N_M$ toward a value of '$N_{Mj} - (\Delta N_M)_B$'.

Further, the speed control stabilization section may be started from the time point B2, and when the motor speed, which is the transmission input shaft rotary speed $N_M$, has reached a value of '$N_M \geq N_{MJ} - (\Delta N_M)_B - a$' as the entry condition of the speed control stabilization section, it may be set to enter into the speed control stabilization section. When the motor speed $N_M$ reaches a value of '$N_M \geq N_{MJ} - (\Delta N_M)_B - a$' to enter into the speed control stabilization section at the time point B, the transmission control unit 40 may be configured to maintain and fix the transfer torque $T_A$ of the engagement clutch in the transmission 120 constantly.

The control of the transfer torque $T_A$ at this time may also be performed by the transmission control unit 40 configured to output the command value and adjust the clutch torque $TC_R$ based on the command value. In addition, the hybrid control unit 20 may be configured to execute the speed control of the motor, which is the driving source of the vehicle, to adjust the motor speed $N_M$ that is the transmission input shaft rotary speed to follow '$N_{Mj} - (\Delta N_M)_B$'. At this time, a transmission input shaft angular acceleration $\alpha_i$ may be determined by the transmission input torque $T_i$ when the transfer torque $T_A$ of the engagement clutch is constantly maintained and an equation for calculating the transmission input shaft angular acceleration is expressed by the following Equation 2.

$$\alpha_i = (1/I_i)(T_i - \text{sign}(N_M - N_{Mj})|TC_A|/i_A) \qquad \text{Equation 2}$$

wherein, $I_i$ refers to a transmission input shaft inertia value, and $i_A$ to a gear ratio of the transmission target stage.

When it enters into the inertia phase control section, which is the B-C section, after passing through the torque phase control section, which is the A-B section, the torques $T_R$, $TC_R$ shared by the disengagement element (the disengagement clutch) after the time point B (i.e., the time pint B1) disappear, such that the shared torque of the engagement clutch becomes '$T_A/i_A$' based on the input shaft, and the '$T_A/i_A$', which is the shared torque of the engagement clutch based on the input shaft, becomes equal to the transmission input torque (the transmission input shaft torque) $T_i$, which is the torque of the vehicle driving source.

Therefore, the transmission input shaft angular acceleration $\alpha_i$ becomes 0 ('$T_A=TC_A$') after the time point B by the Equation 2, and the angular acceleration $\alpha_i$ is formed to be about zero even when the time point B has been determined by decreasing the transfer torque $T_A$ of the engagement clutch at a certain slope during the torque phase control section (the A-B section) in the drawing (increasing based on an absolute value) as in the line diagram of FIG. 6.

In addition, the synchronization may be performed without shock only when the angular acceleration $\alpha_i$ is also formed to be about zero at the synchronization time point, such that when the speed control is stabilized after the control in the speed control stabilization section has been started, the transmission input torque (the motor torque) $T_i$ may also converge to the level similar to the initial input torque, that is, the input torque at the time point B at the at least time point C1, etc.

Further, in the shift procedure according to the present disclosure, since the motor torque, which is the transmission input torque $T_i$ at the target stage after the synchronization (e.g., after the time point D that is the transmission completion time point), should be the level of the before-shift torque, which is the negative (−) torque, that is, the initial input torque (i.e., the input torque at the time point A), the speed control stabilization section may be set during a certain time $t_{B2}$.

In order to explain that the level of the transmission input torque $T_i$ is converged to a value similar to the initial input torque level at the time point B1 at the time point B2, the Equation 2 describes the angular acceleration $\alpha_i$ and the angular acceleration of the transmission input shaft after the time point B at which the inertia phase control section has been started is determined by the Equation 2, and this has been derived from the equation of '$T_i$−sign($N_M$−$N_{Mj}$)|$TC_A$|/$i_A$=$I_i\alpha_i$'.

In the active shift control, the magnitude of the transmission input torque $T_i$ and the input shaft-based clutch torque ('$T_A/i_A$') are almost balanced at the time point B, such that the angular acceleration is zero, and thereafter, when the speed control is performed to satisfy a desired speed or acceleration profile, the angular acceleration will be about zero again at the time point when the synchronization has been almost satisfied, and thus, the level of the transmission input torque $T_i$ may converge to the initial input torque level at the time point B.

In addition, a speed difference used in the Equations 1 and 2, that is, a difference ('$N_M$−$N_{Mj}$') between the current transmission input shaft rotary speed (the motor speed) $N_M$ and the target stage synchronization speed $N_{Mj}$ may be used both in determining the clutch front-end transfer torque and the clutch rear-end transfer torque. The torque transferred to the rear end of the clutch in a state that has entered the inertia phase control section after the time point B is expressed by the following Equation 3 based on the transmission output shaft.

$$\text{sign}(N_M-N_{Mj})|TC_A|-R_{total}=I_O\alpha_O \quad \text{Equation 3}$$

wherein, $R_{total}$ refers to the sum of all traveling loads based on the transmission output shaft.

Therefore, to simulate the power train load of a non-environmental vehicle, the current transmission input shaft rotary speed may be set to be less than the target stage synchronization speed, and when the current transmission input shaft rotary speed is formed greater than the target stage synchronization speed, the vehicle acceleration may have a positive (+) value, such that it may be adjusted in reverse to the vehicle acceleration (herein, indicating the acceleration is a negative (−) acceleration, that is, the deceleration).

The synchronization preparation section may be started at the time point C1, and the condition that the predetermined first setting time $t_{B2}$ has elapsed from the time point B2 may be set as the entry condition of the synchronization preparation section. In other words, the synchronization preparation section may be started at the time point C1 when the first setting time $t_{B2}$ has elapsed from the time point B2.

As described above, when the synchronization preparation section is started, the transmission control unit 40 may be configured to increase the transfer torque $T_A$ of the engagement element (the engagement clutch) at a certain slope based on the absolute value thereof until the synchronization determination (e.g., decreasing it in the negative (−) torque region in FIG. 6 in the drawing), and for this purpose, the command value of the clutch torque $TC_A$ may be increased at a certain slope based on the absolute value thereof.

In addition, in the synchronization preparation section, the hybrid control unit 20 may be configured to stop the speed control for the motor 110, which is the vehicle driving source, and also maintain the motor torque that becomes the transmission input torque $T_i$ (the vehicle driving torque) in a torque state at the time point C1, which is the entry time point thereof. When the motor speed, which is the transmission input shaft rotary speed $N_M$, reaches the target stage synchronization speed $N_{Mj}$ at the time point C2, it enters the synchronization section in which the speed synchronization may be performed.

At this time, as an entry condition of the synchronization section, for example, in the case of a condition where a state of '|$N_M$−$N_{Mj}$|<($\Delta N_M$)$_C$' is continuously satisfied during a certain time, it may be determined as a state where the speed synchronization has been performed. After the speed synchronization is performed, the transmission control unit 40 may be configured to increase the clutch torque $TC_A$ of the engagement element at a predetermined certain slope from the time point C2 to the maximum clutch torque based on the absolute value thereof to complete the engagement of the engagement clutch C2, to thus apply the maximum clutch torque to the engagement element and to implement a reliable synchronization after the time point C2.

In addition, the hybrid control unit 20 may be configured to maintain the torque (i.e., the motor torque) $T_i$ of the vehicle driving source, which is the transmission input torque until the time point C2, at the torque at the time point C1, and then, may be gradually decreased at the predetermined certain slope as in the line diagram in FIG. 6. In other words, gradually increase the transmission input torque $T_i$ at a certain slope after the time point C based on the absolute value thereof.

Thereafter, the clutch control of the transmission by the transmission control unit 40 may be terminated at the time point D when the second setting time has elapsed from the time point C2, and the shift of the power-off downshift according to the present disclosure may be completed in a state where the motor torque, which is the transmission input torque $T_i$, has been converted into the before-shift torque by the hybrid control unit 20.

As described above, according to the active shift control method for the power-off downshift of the present disclosure, it may be possible to rapidly generate the desired vehicle deceleration without the vehicle acceleration feeling occurring, and to achieve a decrease of the shift time and enhancement of the driving performance. More specifically, it may be possible to perform the torque phase control for blending the torque of the engagement clutch and the torque of the disengagement clutch during the power-off downshift control procedure of the EV mode, thereby securing the deceleration feeling by the torque step before and after shifting from the initial shift.

In addition, it may be possible to maintain a certain deceleration during the motor speed change section, and to decrease the shift time in the power-off downshift control procedure of the EV mode. It may be possible to maintain the torque of the engagement clutch when the transmission input shaft rotary speed during the shifting increases and to set the transmission input shaft rotary speed to be less than the target stage synchronization speed through the speed control of the vehicle driving source, thereby maintaining the vehicle deceleration, and decreasing the speed increase time to enhance the driving feeling.

As described above, although the exemplary embodiments of the present disclosure have been described in detail with reference to the drawings, the present disclosure is not limited to the above-described exemplary embodiments, and various modifications can be made without departing from the technical scope of the present disclosure.

What is claimed is:

1. An active shift control method for a power-off downshift of a hybrid vehicle, comprising:
   performing, by a controller, a torque blending control for increasing the torque of an engagement clutch in a transmission while disengaging a disengagement clutch by reducing the torque of the disengagement clutch in the transmission, in response to determining that the shift of a power-off downshift according to a downshift operation of a driver is requested during coasting of a vehicle;
   adjusting, by the controller, a motor speed to cause a transmission input shaft rotary speed to reach a predetermined target stage synchronization speed of a target stage after shifting, and constantly maintaining the torque of the engagement clutch in a state where the disengagement clutch has been disengaged; and
   completing, by the controller, the engagement of the engagement clutch by increasing the torque of the engagement clutch when the transmission input shaft rotary speed has reached the target stage synchronization speed.

2. The active shift control method for the power-off downshift of the hybrid vehicle of claim 1, wherein the adjusting of the motor speed includes:
   adjusting, by the controller, in a speed change section in which the torque of the engagement clutch is constantly maintained and the motor speed is adjusted to increase the transmission input shaft rotary speed toward the target stage synchronization speed.

3. The active shift control method for the power-off downshift of the hybrid vehicle of claim 2, wherein the adjusting of the motor speed further includes:
   adjusting, by the controller, in a speed control stabilization section in which the torque of the engagement clutch is constantly maintained and the motor speed is adjusted to cause the transmission input shaft rotary speed to follow a value of '$N_{Mj}-(\Delta N_M)_B$', wherein, $N_{MJ}$ refers to the target stage synchronization speed and $(\Delta N_M)_B$ to a predetermined margin value, after the adjusting in the speed change section.

4. The active shift control method for the power-off downshift of the hybrid vehicle of claim 3, wherein the adjusting in the speed control stabilization section is started when the motor speed has reached a value of '$N_M \geq N_{MJ} - (\Delta N_M)_B - a$', wherein, $N_M$ refers to the transmission input shaft rotary speed, and a to a positive (+) value and is a predetermined setting value.

5. The active shift control method for the power-off downshift of the hybrid vehicle of claim 4, wherein the $(\Delta N_M)_B$ is set to a positive (+) value and adjusted to decrease the transmission input shaft rotary speed to less than the target stage synchronization speed in the speed change section and the speed control stabilization section.

6. The active shift control method for the power-off downshift of the hybrid vehicle of claim 3, wherein the adjusting of the motor speed further includes:
   adjusting, by the controller, in a synchronization preparation section in which the controller increases the torque of the engagement clutch at a predetermined slope and maintains a motor torque, which is a transmission input torque, while stopping the adjustment for the motor speed, until a synchronization determination time point after the adjusting in the speed control stabilization section.

7. The active shift control method for the power-off downshift of the hybrid vehicle of claim 6, wherein the controller is configured to start adjustment in the synchronization preparation section at the time point that has elapsed a predetermined first setting time after the adjusting in the speed control stabilization section has been started.

8. The active shift control method for the power-off downshift of the hybrid vehicle of claim 6, wherein the controller is configured to adjust the motor torque, which is the transmission input torque, to become a torque value of the motor before shifting at the time point when the adjusting in the synchronization preparation section is started.

9. The active shift control method for the power-off downshift of the hybrid vehicle of claim 1, wherein in the adjusting of the motor speed for the transmission input shaft rotary speed to reach the target stage synchronization speed, the controller is configured to decrease a motor torque, which is a transmission input torque, based on an absolute value in a negative (−) torque region and then increase the motor torque to the torque value of the motore before shifting again.

10. The active shift control method for the power-off downshift of the hybrid vehicle of claim 1, wherein in the performing of the torque blending control, the controller is configured to maintain a motor torque, which is a transmission input torque, at a constant negative (−) torque to be the same as before-shift without changing.

11. The active shift control method for the power-off downshift of the hybrid vehicle of claim 1, wherein in the performing of the torque blending control, the controller is configured to increase the torque of the engagement clutch in the transmission at a first predetermined slope while reducing the torque of the disengagement clutch in the transmission at a second predetermined slope.

12. The active shift control method for the power-off downshift of the hybrid vehicle of claim 11, wherein the controller is configured to adjust the torque of the engagement clutch and the torque of the disengagement clutch to increase a transmission output torque determined by the sum of the torque of the engagement clutch and the torque of the disengagement clutch at a predetermined slope based on an absolute value in a negative (−) torque region.

\* \* \* \* \*